(12) United States Patent
Schrecker

(10) Patent No.: US 9,544,772 B2
(45) Date of Patent: Jan. 10, 2017

(54) SIMPLIFIED MOBILE COMMUNICATION DEVICE

(71) Applicant: McAfee, Inc., Santa Clara, CA (US)

(72) Inventor: Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/840,578

(22) Filed: Aug. 31, 2015

(65) Prior Publication Data

US 2015/0373542 A1 Dec. 24, 2015

Related U.S. Application Data

(63) Continuation of application No. 13/340,631, filed on Dec. 29, 2011, now Pat. No. 9,131,370.

(51) Int. Cl.

| H04M 1/66 | (2006.01) |
|---|---|
| H04W 12/06 | (2009.01) |
| H04B 5/00 | (2006.01) |
| H04W 12/04 | (2009.01) |
| H04M 1/02 | (2006.01) |

(Continued)

(52) U.S. Cl.
CPC .......... *H04W 12/06* (2013.01); *H04B 5/0006* (2013.01); *H04B 5/0031* (2013.01); *H04M 1/0258* (2013.01); *H04M 1/7253* (2013.01); *H04W 12/04* (2013.01); *H04L 63/0861* (2013.01);

(Continued)

(58) Field of Classification Search
None
See application file for complete search history.

(56) References Cited

U.S. PATENT DOCUMENTS

| 5,913,163 A | 6/1999 | Johansson |
|---|---|---|
| 5,987,610 A | 11/1999 | Franczek et al. |

(Continued)

FOREIGN PATENT DOCUMENTS

| EP | 1536306 A1 | 6/2005 |
|---|---|---|
| KR | 10-2009-0100112 A | 9/2009 |

(Continued)

OTHER PUBLICATIONS

Bluetooth Security White Paper by Bluetooth SIG Security Expert Group, dated Apr. 19, 2002.*

(Continued)

*Primary Examiner* — Daniel Lai
(74) *Attorney, Agent, or Firm* — Patent Capital Group

(57) ABSTRACT

A first communication device is detected as being substantially collocated with a second communication device using a short-range wireless network. A connection is established between the first and second communication devices over the short-range wireless network. In some instances, authentication data can be sent from the second communication device to the first communication device to authenticate a user to the first communication device. Further, input is received from the first communication device over the short-range wireless network specifying a telephone number for a telephone call using the second communication device. A connection is established between the second communication device and a cellular base station to initiate the telephone call with a third communication device associated with the telephone number. In some instances, the second communication device is a wireless headset device.

20 Claims, 9 Drawing Sheets

(51) Int. Cl.
*H04M 1/725* (2006.01)
*H04L 29/06* (2006.01)
*H04W 84/12* (2009.01)
*H04W 76/02* (2009.01)
*H04W 88/04* (2009.01)

(52) U.S. Cl.
CPC ............. *H04W 76/02* (2013.01); *H04W 84/12* (2013.01); *H04W 88/04* (2013.01)

(56) References Cited

U.S. PATENT DOCUMENTS

| | | | |
|---|---|---|---|
| 6,073,142 A | 6/2000 | Geiger et al. | |
| 6,460,050 B1 | 10/2002 | Pace et al. | |
| 6,542,729 B1 | 4/2003 | Chmaytelli et al. | |
| 6,760,841 B1 | 7/2004 | Fernandez | |
| 6,975,425 B1 | 12/2005 | Abe et al. | |
| 7,318,234 B1 | 1/2008 | Dharmarajan | |
| 7,324,806 B2 | 1/2008 | Tomita | |
| 7,506,155 B1 | 3/2009 | Stewart et al. | |
| 7,565,554 B2 | 7/2009 | Joosten et al. | |
| 7,600,000 B2 | 10/2009 | Yao et al. | |
| 7,742,741 B2 | 6/2010 | Borowski et al. | |
| 7,840,206 B2 | 11/2010 | Kaechi | |
| 7,933,968 B1 | 4/2011 | Zimmerman | |
| 7,966,437 B1 | 6/2011 | Spoden | |
| 7,983,615 B2 | 7/2011 | Bryce et al. | |
| 7,995,119 B2 | 8/2011 | Kato et al. | |
| 8,099,605 B1 | 1/2012 | Billsrom et al. | |
| 8,176,230 B2 | 5/2012 | Chen et al. | |
| 8,280,304 B2 | 10/2012 | Hirsch | |
| 8,307,413 B2 | 11/2012 | Smadja et al. | |
| 8,331,860 B2 | 12/2012 | Sinivaara et al. | |
| 8,356,338 B1 | 1/2013 | Contino et al. | |
| 8,447,233 B2 | 5/2013 | Hirsch | |
| 8,555,079 B2 | 10/2013 | Shablygin et al. | |
| 8,565,132 B2 | 10/2013 | Shibuya | |
| 8,627,075 B2 | 1/2014 | Ikeda et al. | |
| 8,819,445 B2 | 8/2014 | Schrecker | |
| 9,131,370 B2 | 9/2015 | Schrecker | |
| 9,262,592 B2 | 2/2016 | Schrecker | |
| 2002/0059532 A1 | 5/2002 | Ata et al. | |
| 2002/0115479 A1* | 8/2002 | Tischler | H04M 1/05 455/575.5 |
| 2003/0056098 A1 | 3/2003 | Aihara | |
| 2003/0109218 A1 | 6/2003 | Pourkeramati et al. | |
| 2003/0131255 A1 | 7/2003 | Shim | |
| 2004/0063471 A1 | 4/2004 | Kindo et al. | |
| 2004/0073792 A1 | 4/2004 | Noble et al. | |
| 2004/0123127 A1 | 6/2004 | Teicher et al. | |
| 2004/0132437 A1 | 7/2004 | Ohmori et al. | |
| 2004/0137969 A1 | 7/2004 | Nassimi | |
| 2004/0242250 A1 | 12/2004 | Sasai et al. | |
| 2004/0247023 A1 | 12/2004 | Sasai et al. | |
| 2005/0005041 A1 | 1/2005 | Lin et al. | |
| 2005/0105734 A1 | 5/2005 | Buer et al. | |
| 2005/0132075 A1 | 6/2005 | Creamer et al. | |
| 2005/0235019 A1 | 10/2005 | Yang | |
| 2005/0251633 A1 | 11/2005 | Micka et al. | |
| 2005/0254650 A1 | 11/2005 | Sakurai et al. | |
| 2005/0256907 A1 | 11/2005 | Novik et al. | |
| 2006/0072241 A1 | 4/2006 | Feliss et al. | |
| 2006/0176146 A1 | 8/2006 | Krishan et al. | |
| 2006/0183425 A1 | 8/2006 | Seshadri et al. | |
| 2006/0246840 A1 | 11/2006 | Borowski et al. | |
| 2007/0015589 A1 | 1/2007 | Shimizu et al. | |
| 2007/0067466 A1 | 3/2007 | Gallant et al. | |
| 2007/0154162 A1 | 7/2007 | Kato et al. | |
| 2007/0220614 A1* | 9/2007 | Ellis | G06F 21/6245 726/27 |
| 2007/0226501 A1 | 9/2007 | Saitoh | |
| 2007/0239929 A1 | 10/2007 | Chen et al. | |
| 2007/0249331 A1 | 10/2007 | Sinivaara et al. | |
| 2007/0260751 A1 | 11/2007 | Meesseman | |
| 2007/0294474 A1 | 12/2007 | Panabaker et al. | |
| 2008/0005268 A1* | 1/2008 | Chen | G06F 17/30864 709/217 |
| 2008/0052457 A1 | 2/2008 | Schilling et al. | |
| 2008/0092204 A1 | 4/2008 | Bryce et al. | |
| 2008/0109895 A1 | 5/2008 | Janevski | |
| 2008/0113689 A1* | 5/2008 | Bailey | H04M 1/6066 455/569.1 |
| 2008/0117847 A1 | 5/2008 | Hamada | |
| 2008/0141041 A1 | 6/2008 | Molaro et al. | |
| 2008/0168197 A1 | 7/2008 | Salomon et al. | |
| 2008/0207268 A1 | 8/2008 | Tom | |
| 2008/0279382 A1 | 11/2008 | Chen et al. | |
| 2008/0301790 A1 | 12/2008 | Halasz et al. | |
| 2009/0006846 A1* | 1/2009 | Rosenblatt | H04W 12/08 713/159 |
| 2009/0044260 A1 | 2/2009 | Niglio et al. | |
| 2009/0055408 A1 | 2/2009 | Warren et al. | |
| 2009/0061773 A1 | 3/2009 | Loh et al. | |
| 2009/0163200 A1* | 6/2009 | Christian | H04M 1/7253 455/426.1 |
| 2009/0176529 A1 | 7/2009 | Warren et al. | |
| 2009/0187759 A1 | 7/2009 | Marsico | |
| 2009/0193178 A1 | 7/2009 | Warren et al. | |
| 2009/0235021 A1 | 9/2009 | Panabaker et al. | |
| 2009/0253374 A1 | 10/2009 | Matsuo et al. | |
| 2009/0257592 A1 | 10/2009 | Sato | |
| 2009/0289758 A1 | 11/2009 | Yuasa | |
| 2009/0300020 A1 | 12/2009 | Chen et al. | |
| 2010/0007768 A1 | 1/2010 | Yong et al. | |
| 2010/0041447 A1 | 2/2010 | Graylin | |
| 2010/0075631 A1* | 3/2010 | Black | H04M 1/05 455/410 |
| 2010/0100590 A1 | 4/2010 | Palay et al. | |
| 2010/0167643 A1 | 7/2010 | Hirsch | |
| 2010/0245585 A1 | 9/2010 | Fisher et al. | |
| 2010/0254368 A1 | 10/2010 | Yamaura | |
| 2010/0311390 A9 | 12/2010 | Black et al. | |
| 2010/0332682 A1 | 12/2010 | Sharp et al. | |
| 2011/0063990 A1 | 3/2011 | Nogawa | |
| 2011/0072503 A1 | 3/2011 | Tan | |
| 2011/0092187 A1* | 4/2011 | Miller | H04L 12/1818 455/412.1 |
| 2011/0111698 A1 | 5/2011 | Odakura | |
| 2011/0138079 A1 | 6/2011 | Esaka et al. | |
| 2011/0145299 A1 | 6/2011 | Zhou | |
| 2011/0191833 A1 | 8/2011 | Yi et al. | |
| 2011/0243256 A1 | 10/2011 | Matsuoka | |
| 2011/0275323 A1 | 11/2011 | Goldman et al. | |
| 2011/0296186 A1 | 12/2011 | Wong et al. | |
| 2011/0305335 A1 | 12/2011 | Negishi et al. | |
| 2011/0319135 A1 | 12/2011 | Yuasa | |
| 2012/0066753 A1 | 3/2012 | Pan | |
| 2012/0108181 A1 | 5/2012 | Matsuo et al. | |
| 2012/0156996 A1 | 6/2012 | Oba et al. | |
| 2012/0161924 A1 | 6/2012 | Lin | |
| 2012/0171959 A1 | 7/2012 | Cheng | |
| 2012/0185547 A1 | 7/2012 | Hugg et al. | |
| 2012/0198535 A1 | 8/2012 | Oberheide et al. | |
| 2012/0231769 A1* | 9/2012 | Sakissian | H04M 1/6066 455/414.1 |
| 2012/0236788 A1 | 9/2012 | Maddali et al. | |
| 2012/0309318 A1 | 12/2012 | Matsuo et al. | |
| 2012/0322375 A1 | 12/2012 | Hirsch | |
| 2012/0324556 A1 | 12/2012 | Yefimov et al. | |
| 2013/0022185 A9 | 1/2013 | Khedouri et al. | |
| 2013/0024932 A1 | 1/2013 | Toebes et al. | |
| 2013/0047266 A1 | 2/2013 | Radhakrishnan et al. | |
| 2013/0124858 A1 | 5/2013 | Kang | |
| 2013/0152183 A1 | 6/2013 | Plewnia et al. | |
| 2013/0171965 A1 | 7/2013 | Schrecker et al. | |
| 2013/0174252 A1 | 7/2013 | Weber et al. | |
| 2013/0231048 A1 | 9/2013 | Hirsch | |
| 2013/0247117 A1 | 9/2013 | Yamada et al. | |
| 2013/0268687 A1 | 10/2013 | Schrecker | |
| 2013/0268758 A1 | 10/2013 | Schrecker | |
| 2013/0268766 A1 | 10/2013 | Schrecker | |

(56) References Cited

U.S. PATENT DOCUMENTS

2013/0268767 A1    10/2013    Schrecker
2014/0009268 A1     1/2014    Oshima et al.

FOREIGN PATENT DOCUMENTS

KR    10-2011-0083050 A    7/2011
WO    WO 2013/101528        7/2013

OTHER PUBLICATIONS

Information Technology Risk Management, Copyright 2002, © Glen B. Alleman, Niwor, Colorado, 22 pages.
USPTO Apr. 2, 2013 Nonfinal Office Action from U.S. Appl. No. 13/340,631.
USPTO Apr. 12, 2013 Nonfinal Office Action from U.S. Appl. No. 13/442,802.
Shwetak N. Patel; A Gesture-based Authentication Scheme for Untrusted Public Terminals; ACM; vol. 6, Issue 2, 4 pages, Copyright 2004.
International Search Report and Written Opinion mailed Apr. 29, 2013 for International Application No. PCT/US2012/070196.
USPTO Sep. 13, 2013 Final Office Action from U.S. Appl. No. 13/340,631.
USPTO Mar. 27, 2014 Nonfinal Office Action from U.S. Appl. No. 13/340,631.
International Preliminary Report on Patentability for International Application No. PCT/US2012/070196, mailed Jul. 1, 2014, 6 pages.
USPTO Aug. 7, 2014 Final Office Action from U.S. Appl. No. 13/340,631.
USPTO Dec. 17, 2014 Nonfinal Office Action from U.S. Appl. No. 13/340,631, 24 pages.
USPTO Apr. 29, 2015 Notice of Allowance from U.S. Appl. No. 13/340,631, 16 pages.
Supplementary European Search Report in EP Application No. 12 86 2346, mailed on Aug. 24, 2015, 6 pages.

\* cited by examiner

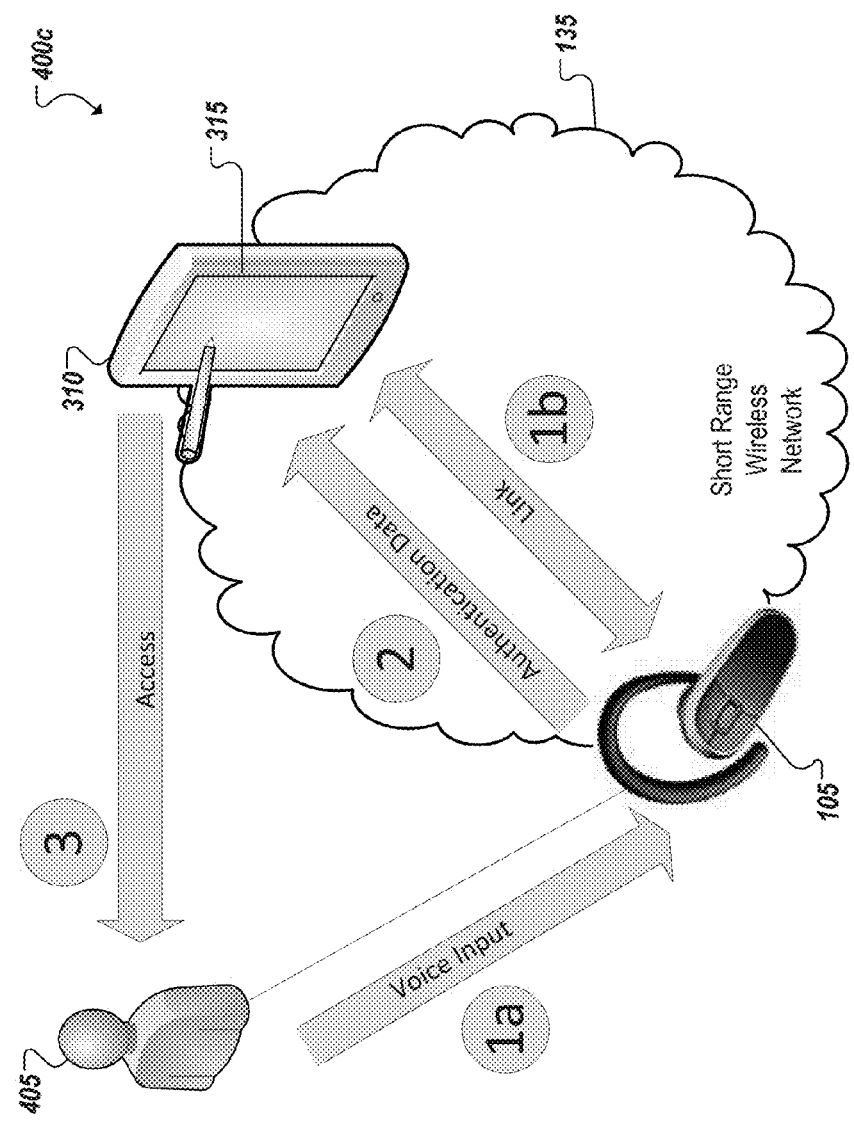

SIMPLIFIED MOBILE COMMUNICATION DEVICE

RELATED APPLICATION

This Application is a continuation (and claims the benefit of priority under 35 U.S.C. §120) of U.S. application Ser. No. 13/340,631, filed Dec. 29, 2011, entitled "SIMPLIFIED MOBILE COMMUNICATION DEVICE," Inventor Sven Schrecker. The disclosure of the prior application is considered part of (and is incorporated in its entirety by reference in) the disclosure of this application.

TECHNICAL FIELD

This disclosure relates in general to the field of communications and, more particularly, to mobile communication devices.

BACKGROUND

With the sale, production, and deployment of mobile phones and other handheld and mobile computing devices eclipsing more traditional desktop personal computing devices, consumers and users have come to expect increased mobility in their access to computer applications, the Internet, digital communications, and other software services and resources. This increased demand has contributed to a corresponding acceleration in developments and advancements within mobile computing devices. Service providers and device manufacturers, carriers, and retailers have developed business models in some cases encouraging the purchase of new devices, with some customers electing to purchase or replace new devices, such as new cell phones and smart phones, multiple times per year to keep pace with the latest models and feature offerings. Aside from the financial commitment of purchasing multiple devices, migrating and reproducing data and programs from one mobile device to another newer device can be difficult and inconvenient.

Mobile computing devices can connect to multiple different networks using a variety of protocols. Mobile computing devices exist that are adapted to connect to WiFi networks, wireless broadband networks (such as 3G, 4G, LTE, and other cellular networks), as well as short range networks such as BLUETOOTH piconets. Peripheral devices have been developed for mobile computing devices such as smartphones and other mobile phones, such as BLUETOOTH hands-free headset devices, allowing a user to send and receive voice data to their mobile phone using the headset device.

BRIEF DESCRIPTION OF THE DRAWINGS

FIGS. 4A-4C are simplified block diagrams illustrating example authentication techniques involving a simplified cellular telephone device in accordance with some embodiments;

Like reference numbers and designations in the various drawings indicate like elements.

DETAILED DESCRIPTION OF EXAMPLE EMBODIMENTS

Overview

Figure 1:
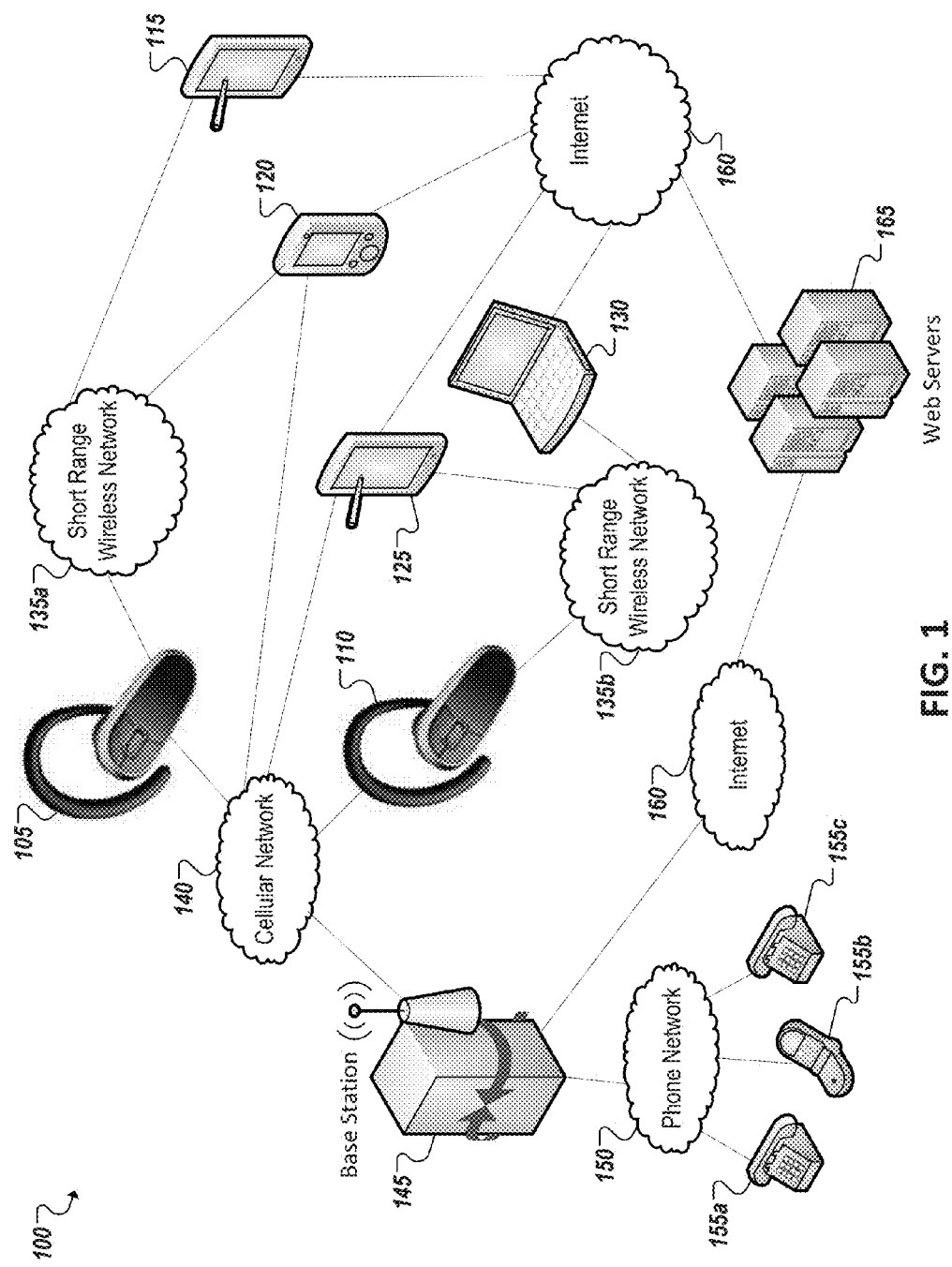
FIG. 1 is a simplified schematic diagram of an example computing system including one or more simplified cellular telephone devices operating in connection with one or more cooperating computing devices in accordance with one embodiment.

In general, one aspect of the subject matter described in this specification can be embodied in methods that include the actions of detecting a first communication device as substantially collocated with a wireless headset device using a short-range wireless network and establishing a connection between the first communication device and the wireless headset device over the short-range wireless network. Input can be received from the first communication device over the short-range wireless network specifying a telephone number for a telephone call using the wireless headset device. A connection can be established between the wireless headset device and a cellular base station to initiate the telephone call with a second communication device associated with the telephone number.

Further, in another general aspect, a system can be provided including at least one processor device, at least one memory element, a short range wireless network adapter, and a device coordinator. The device coordinator, when executed by the processor, can detect a first communication device as substantially collocated with the apparatus using a short-range wireless network, establish a connection with the first communication device over the short-range wireless network, and communicate the user authentication data to the first communication device over the short-range wireless network to authenticate a particular user to the first communication device. In some instances, the system can further include a microphone, speaker, and cellular adapter including an antenna and adapted to establish a connection with a cellular base station to initiate the telephone call with a second communication device associated with the telephone number.

Further, in another general aspect, subject matter described in this specification can be embodied in methods that include the actions of detecting a first communication device as substantially collocated with a second communication device using a short-range wireless network, establishing a connection between the first communication device and the second communication device over the short-range wireless network, and receiving authentication data from the first communication device over the short-range wireless network. The authentication data can be used to authenticate a particular user to the second communication device. Thereafter, a telephone number can be sent to the first communication device for use by the first communication device in establishing a telephone call with another device associated with the telephone number.

These and other embodiments can each optionally include one or more of the following features. The apparatus can include a wireless headset device. The wireless headset device can be adapted to capture voice inputs and output audio. The apparatus can further include a voice recognition module adapted to authenticate a user based on voice inputs received at the microphone. The apparatus can lack tactile input interfaces and a graphical user display. Voice inputs can be received at the wireless headset device and voice data can be sent corresponding to the received voice inputs to the cellular base station in connection with the telephone call. The voice data can be sent by the wireless headset device. Communications can be received from the second communication device forwarded by a cellular base station in connection with the telephone call and audio outputs can be presented at the wireless headset device corresponding to the received communications. Authentication data can be sent from the wireless headset device to the first communication device, the authentication data used by the first communication device to authenticate a user to the first communication device. The authentication data can include an encryption key and content accessible through the first communication device is decrypted based at least in part on the received encryption key. The authentication data can be sent over the short-range wireless network. The authentication data can include at least one of a digital certificate, digital signature, and an encryption key. Authentication of the user to the first communication device can include receiving second authentication data from the user at the first communication device. The second authentication data can include a personal identification number (PIN) entered by the user at an interface of the first communication device. In some instances, a third communication can be detected as substantially collocated with the wireless headset device using a short-range wireless network and a connection can be established between the third communication device and the wireless headset device over a short-range wireless network. Second input data can be received from the third communication device over a short-range wireless network specifying a telephone number for a second telephone call using the wireless headset device and a connection between the wireless headset device and a cellular base station can be established to initiate the second telephone call.

Further, embodiments can each optionally include one or more of the following features. The short-range wireless network can include at least one of a BLUETOOTH piconet and a WiFi local area network. Voice input can be received from a user and compared against a voice profile for the user to authenticate the user on the wireless headset device based on the comparison. Indeed, a user-entered authentication input can be received in addition to the authentication data, and both the received authentication data and user-entered authentication input can be used in the authentication of the particular user to a cooperating communication device. The user-entered authentication data input can be a voice sample for comparison with a voice recognition sample for the particular user or can be a user-entered passkey. User profile data can be identified corresponding to the particular user based on the received authentication data and access can be provided to the user profile data through a user interface of the second communication device. The user profile data can be identified from a set of profile data associated with a plurality of user profiles including a user profile of the particular user. The user profile data can be hosted by a storage device remote from the second communication device and providing access to the user profile data can include authenticating access to the storage device. Use of a cooperating computing device can be locked pending authentication to the device using the wireless headset device or other simplified mobile communication device.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing system 100 including a plurality of simplified mobile communication devices (e.g., 105, 110) each capable of establishing and participating in communications over one or more cellular communication networks (e.g., 140). Simplified mobile communication devices 105, 110 can also establish and participate in further communications with cooperating computing devices (e.g., 115, 120, 125, 130). For instance, simplified mobile communication devices (e.g., 105, 110) can include simplified telephone devices (e.g., 105, 110) and can connect to or communicate with other more-robust computing devices, such as personal digital assistants, tablet computers, laptop or desktop personal computers, smartphones, etc. (e.g., 115, 120, 125, 130), over short range communication networks (e.g., 135a, 135b) using such technology as WiFi or BLUETOOTH.

Simplified mobile communication devices 105, 110 can include functionality allowing a user to connect to one or more cellular network base stations (e.g., 145) to access one or more telephone networks, such as a public switched telephone network (PSTN) or other telephone networks including voice-over-IP (VOIP) networks, push-to-talk networks, etc. The simplified communication device 105, 110 can be used, for instance, to place, accept, and otherwise participate in telephone calls with other telephone devices (e.g., 155a-c) over telephone network 145. Simplified mobile communication device 105, 110 can also access data networks, such as the Internet 160, over cellular network 140, and access and consume applications, services, data, and other resources served by web servers 165 and other devices coupled to the data network 160.

In some instances, simplified mobile communication devices 105, 110 may include functionality for engaging in cellular telephone communications and presenting and receiving voice data to the user, while providing little to no tactile input/output (I/O) functionality on the device 105, 110, such as a keypad, touchscreen, or other tactile controls typically included on cellular telephone devices. Omitting I/O controls, devices, and interfaces capable of receiving tactile input or graphical displays can allow for the implementation of more compact cellular telephone devices 105, 110. In some instances, simplified mobile communication devices 105, 110 can be adapted to be conveniently carried or worn by a user, thereby more directly connecting the user to the simplified mobile communication devices 105, 110 and physically associating the user with the mobile communication device 105, 110. Indeed, in some implementations, simplified mobile communication devices 105, 110 can be used as a physical security token for use in authenticating the simplified mobile communication device's user with particular cooperating computing devices 115, 120, 125, 130 or data, applications, or other digital resources accessible, for instance, using cooperating computing devices 115, 120, 125, 130.

In some instances, a simplified mobile communication device (e.g., 105) can accept inputs from a cooperating computing device (e.g., 115) connected to the simplified mobile communication device over a short range wireless network (e.g., 135a) in connection with the simplified mobile communication device's initiation or participation in a telephone call. For example, simplified mobile communication device 105, in some instances, may not include a user interface that allows a user to key-in a telephone number, view or select a listing of contacts, or otherwise select or view telephone numbers associated with the call. For example, a user can enter a particular telephone number to be called using the simplified mobile communication device (e.g., 105) using a graphical user interface, such as presented on a touchpad display of the cooperating device (e.g., 115). In other instances, cooperating computing devices (e.g., 115) connected to simplified mobile communication device (e.g., 105) can be used to display data received by the simplified mobile communication device (e.g., 105) (for instance, over a data network 160), for example, because simplified mobile communication device 105 includes insufficient data rendering and graphical display capabilities, among other examples.

While simplified mobile communication devices 105, 110, in some implementations, can be used to access data adapted for display using one or more rendering applications (such as web browsers) and graphical display devices not included in the simplified mobile communication device. The simplified mobile communication device can communicate such data to cooperating computing devices 115, 120, 125, 130 for rendering and display using the cooperating computing devices 115, 120, 125, 130. In some instances, one or more of the cooperating computing devices 115, 120, 125, 130 can also include functionality for connecting to and accessing web-based resources (e.g., over network 160) independent of any simplified communication devices (e.g., 105, 110) connected to the cooperating device.

In general, "servers," "clients," and "computing devices," including computing devices used to implement system 100 (e.g., 105, 110, 115, 120, 125, 130, 140, 145, 165), can include electronic computing devices operable to receive, transmit, process, store, communicate, or manage data and information associated with the software system 100. As used in this document, the term "computer," "computing device," "processor," or "processing device" is intended to encompass any suitable processing device. For example, elements of the system 100 may be implemented using distributed computing environments, including parallel processing environments, server pools, and cloud computing environments. Further, any, all, or some of the computing devices may be adapted to execute any operating system, including Linux, UNIX, Windows Server, etc., mobile operating system, including Apple iOS™, Google Android™, Windriver™, etc. as well as virtual machines adapted to virtualize execution of a particular operating system, including mobile, customized, and proprietary operating systems.

Further, servers, clients, and computing devices (e.g., 105, 110, 115, 120, 125, 130, 140, 145, 165) can each include one or more processors, computer-readable memory, and one or more interfaces, among other features and hardware. Servers and computing devices can include any suitable software component or module, or computing device(s) capable of hosting and/or serving a software application or services (e.g., services of web server 165, applications of computing devices 115, 120, 125, 130), including mobile, distributed, enterprise, or cloud-based software applications, data, and services.

Cooperating computing devices 115, 120, 125, 130 can include laptop computers, desktop computers, tablet computers, shared computing kiosks, smartphones, personal digital assistants, handheld video game consoles, and other devices capable of connecting wirelessly to a simplified mobile communication device (e.g., 105, 110) over a short range network (e.g., 135a-b). Attributes and functionality of cooperating computing devices 115, 120, 125, 130 can differ widely from device to device, including the operating systems and collection of software programs loaded, installed, executed, operated, or otherwise accessible to the device, as well as the tools, subsystems, controls, display units, speakers, microphones, keypads, mice, trackballs, cameras, network cards and adapters, graphic cards and adapters, sound cards and adapters, and other components integrated or connected to the cooperating computing device. A device can additional include a respective set of programs that can include operating systems, applications (including "mobile apps"), plug-ins, applets, virtual machines, machine images, drivers, executable files, and other software-based programs capable of being run, executed, or otherwise used by the respective cooperating devices (e.g., 115, 120, 125, 130). Some programs and data stored on or otherwise accessible through a cooperating computing device can be associated with a particular user profile, restricting access to particular programs to users logged-in or otherwise authenticated in connection with the user profile.

Each cooperating computing device can include at least one graphical display device and user interfaces allowing a user to view and interact with graphical user interfaces (GUIs) of applications and other programs provided in system 100. In general, cooperating computing devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," "mobile device," and "user" may be used interchangeably as appropriate without departing from the scope of this disclosure. Moreover, while each cooperating computing device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Traditional cell phones, smart phones, and other mobile computing devices allow a user to interact with one or more GUIs of programs installed or accessed using the computing device. Some devices come equipped with cellular network adapters (including receivers, transmitters, antennae, signal processors, and other functionality allowing users to make telephone calls and connect to data networks (such as the Internet) over cellular networks using the device. Modern smart phones are examples of such devices. Additionally, peripheral devices have been developed, such as BLUETOOTH-enabled headsets, which allow users to make "hands-free" calls using their cellular devices over their hands-free peripheral devices.

Such multi-function devices have become feverishly popular in part because of the convenient access they provide to a multitude of computing tasks. Users can read, write, send and receive email; generate documents; access the Internet; receive GPS directions; make telephone calls; play video games; send SMS messages; video chat; take videos and photos; among a continuing stream of evolving functions and uses. Additionally, users are increasingly acquiring and using multiple computing devices. For instance, a user may have a smart phone for work, a different personal smart phone, a tablet computer for personal use, a laptop for work, a personal desktop; a video game system; and a media server. Further, as each of these respective devices evolves, users may replace and supplement their devices with newer devices with updated or additional functionality.

Managing data across a multitude of devices can be challenging to consumers. Users can synchronize devices to some degree in an attempt to keep some files and data consistent across two or more of their devices, although users often start from scratch when purchasing new devices to replace an outdated, lost, or broken device, re-loading their data and favorite software programs onto the new device. Further, traditional mobile phones and devices are carried in purses, bags, or pockets and are frequently misplaced, lost, or stolen, allowing savvy thieves to gain unauthorized access to the owner's data, data and telephone service, among other sensitive and valuable assets. System implementations such as that outlined in FIG. 1 can resolve many of the issues identified above, among others.

Figure 2:
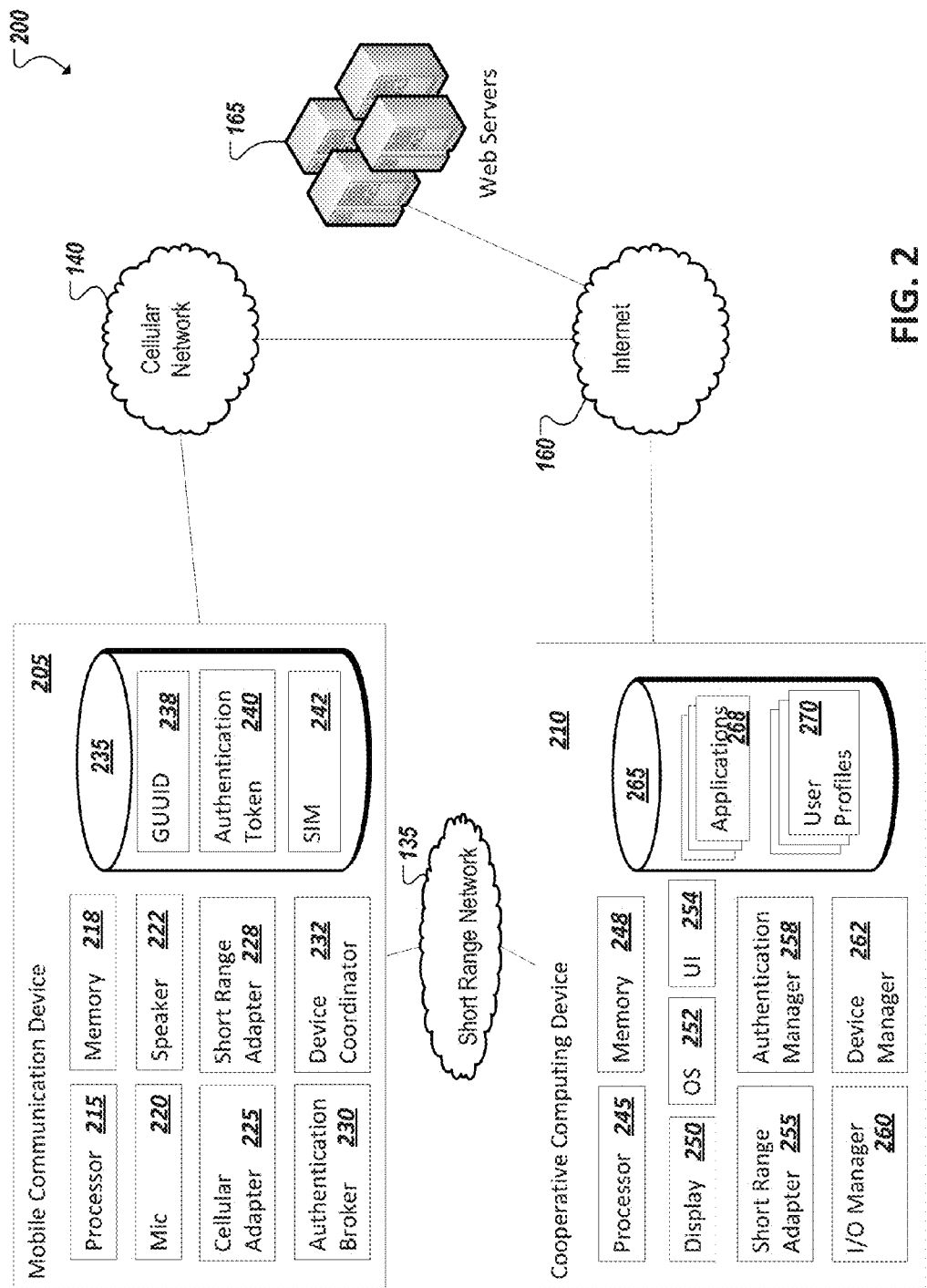
FIG. 2 is a simplified block diagram of an example simplified cellular telephone device and an example cooperating computing device in accordance with one embodiment.

For instance, turning to FIG. 2, a simplified block diagram 200 is shown of an example system including an example simplified mobile communication device 205 and an example cooperative computing device 210. The simplified mobile communication device 205 can be a device equipped to be easily carried or worn by a user, such as a mobile headset, that can receive I/O support from cooperating computing device 210, for instance, by connecting to and communicating with the cooperating computing device 210 over, for example, a short range network 135. A wearable device that can be used as a telephone while worn can mitigate against instances where a mobile phone or device is made available to potential thieves or unauthorized users, such as in instances where a device removed from a carrier, or pocket, set on a desk or table, or other unsecure location. Providing for a compact and wearable simplified mobile device can assist in keeping the simplified mobile communication device 205 secure and in the proper hands.

A simplified mobile communication device 205 can include one or more processors 215 and memory elements 218 used to execute software stored, downloaded, embodied, or otherwise accessible to the device 205, including signal processing functionality and other operations in association with network adapters (e.g., 225, 228) and other modules (e.g., 230, 232) included on mobile communication device 205. In this particular example, simplified mobile communication device 205 can include additional hardware and software adapted to allow a user to input and receive audio and voice through the communication device 205. For instance, simplified mobile communication device 205 can include one or more microphones 220 and speakers 22 for receiving and delivering voice and other audio, for instance, during a telephone call made using the simplified mobile communication device 205. Indeed, mobile communication device 205 can include a cellular adapter 225 adapted to establish and/or connect to and participate in mobile telephony over cellular communication networks. Cellular adapter 225 can include circuitry, software, and logic including components for analog-to-digital and digital-to-analog conversion, digital signal processing, radio frequency (RF) amplifiers and controllers, call processing logic, among other functionality and components used to enable cellular communications, including data communications over wireless mobile broadband networks. Further, simplified mobile communication device 205 can include subscriber identity module (SIM) data (e.g., 242) and other data for use, for instance, by cellular networks in identifying the device 205 and a user or service subscription associated with the device 205.

In addition to cellular adapter 225, simplified mobile communication device 205 can include additional components and functionality to enable the communication device 205 to connect and receive data from one or more cooperating computing devices (e.g., 210) over one or more short range networks (e.g., 135). For example, simplified mobile communication device 205 can include a short range network adapter 228, authentication broker 230, and device coordinator 232. Short range network adapter 228 can be adapted to establish, discover, connect to, and communicate in communication sessions within one or more different short range wireless networks (e.g., 135), including ad hoc wireless networks established using BLUETOOTH or WiFi and thereby facilitate the simplified mobile communication device's 205 connection to and participation in communication sessions with cooperating devices over a short range network, such as a BLUETOOTH piconet or a WiFi network. A short range network adapter 228 can further include antennae and other hardware for discovering, transmitting, and receiving radio signals to and from other devices in connection with participation within a wireless communication session over one or more short range wireless networks (e.g., 135).

Simplified mobile communication device 205 may be considered simplified in that it lacks most of the functionality available in modern computing devices, such as personal computers, tablet computers, smart phones, and the like, while still functioning as a standalone cellular telephone device. In some instances, simplified mobile communication device 205 include minimal software, in some cases limited to logic for use in engaging in communication sessions over cellular networks (e.g., 140) and short range networks (e.g., 135) with other computing devices (e.g., 165, 210). Further, simplified mobile communication devices 205 may lack robust user interfaces and lack the ability to accept tactile user input in connection with the dialing of a phone number or receiving an identifier of another endpoint in a network. In some instances, simplified communication devices 205, while lacking higher-level tactile inputs, such as a keypad, touchscreen, or the like, may include basic tactile inputs for performing basic operations on the simplified communication device 205 such as a power button or volume control, while still lacking higher-level I/O controls. Further, simplified mobile communication device 205 may lack a graphical display device adapted for rendering data received, for instance, from data servers 165 or in connection with one or more programs or data stores of cooperating computing devices (e.g., 210). Due to a lack of tactile UI support and limited I/O and graphical display capabilities on simplified mobile communication devices (e.g., 205), cooperating computing device 210 can link to and serve as a wireless peripheral I/O device of a companion simplified mobile communication device 205, allowing dialed phone numbers, identification of URLs or other address data to be input at the cooperating computing device and forwarded to the simplified communication device 205 for use by the simplified communication device 205 in making telephone calls, contacting remote web and data servers (e.g., 165), and other network endpoints, among other examples.

In some implementations, in addition to serving as a cellular telephone device, simplified mobile communication device 205 can also serve as a physical token for authenticating a user on one or more other computing devices, such as cooperating computing device 210. Authentication data (e.g., 240) can be sent by the simplified mobile communication device 205 to a cooperating computing device 210, for instance, over a short range network connection (e.g., 135). Such authentication data can be used to authenticate or otherwise make the cooperating computing device 210, or particular data, programs, or user profiles available to the user of the simplified mobile communication device 205. For instance, authentication data can include a digital signature or certificate, encryption key, or other authentication data. Further, authentication data can be dependent on identifying that the simplified mobile communication device's 205 is collocated (or within a predetermined proximity) of the cooperating computing device 210. For instance, a key present on the simplified mobile communication device 205 (or cooperating computing device 210) can decrypt data included on the cooperating computing device 210 (or unlock access to the simplified mobile communication device 205) based on a determination that the device holding the key is in proximity with the device to be decrypted or unlocked using the key. In another example, authentication data can be implemented or encoded in the hardware of either (or both) of a simplified mobile communication device 205 or cooperating computing device 210. In essence, the holder or possessor of the simplified mobile communication device 205 can use the mobile communication device 205 to authenticate the user to a user profile or to a device generally based on the user's possession of the device 205 (and the exchanging and verification of authentication data stored on the device 205 with a cooperating computing device (e.g., 210)).

In one example implementation, simplified mobile communication device 205 can include an authentication broker 230 adapted to coordinate the passing of authentication data 240, as well as other data, such as a user identifier, such as a globally-unique user identifier (GUUID) (e.g., 238), to a cooperating computing device (e.g., 210) in connection with a user authenticating to the cooperating computing device 210 by virtue of the user possessing the mobile communication device 205. Cooperating computing device 210 can include modules, such as an authentication manager 258 for use in connection with receiving authentication data (e.g., 240) from a simplified mobile communication device (e.g., 205). For instance, authentication data can be used by the cooperating computing device 210 to authenticate a user to a particular user profile (such as a profile corresponding to the GUUID 238), decrypt data stored on the cooperating computing device 210, among other uses and examples.

Simplified mobile communication device 205 can further include additional modules and functionality. In some instances, a single simplified mobile communication device 205 can connect to and operate cooperatively with a plurality of different cooperating devices. A device coordinator 232 can be used to manage the simplified mobile communication device's 205 cooperation with multiple different cooperating devices, as well as different types of cooperating devices. In some examples, relationships can be established between a particular simplified mobile communication device 205 and two or more cooperating computing devices. Device coordinator 232 can be used to identify that a pre-existing relationship exists between the simplified mobile communication device 205 and a particular cooperating computing device (e.g., based on a previous connection, setup, and/or cooperative interaction session between the devices, for instance, over a short range network 135 or wireline connection). Other functionality can also be provided in some implementations of simplified communication devices, such as voice recognition modules. Voice recognition modules can be used for instance to accept voice commands in connection with the user of the simplified mobile communication device's 205 use in telephone call (e.g., to accept a vocal input of a particular telephone number or contact name associated with a telephone number stored at simplified mobile communication device 205, prompting the dialing of the corresponding telephone number). Voice recognition can also be used to provide two-factor authentication, for instance, beginning with authentication of a user at the simplified mobile communication device 205 itself (e.g., based on a voice match), before allowing the simplified mobile communication device 205 to be used as a physical token to authenticate the same user to one or more cooperating computing devices.

Cooperating computing devices (e.g., 210) can include robust computing functionality, including I/O and graphic display capabilities not available on simplified mobile communication devices 205. For instance, an example cooperating computing device 210, such as a tablet computer, smart phone, personal digital assistant, laptop or personal computer, can include one or more processors 245, memory elements 248, a graphical display 250, and a tactile user interface 254 capable of accepting tactile inputs from a user, such as a keypad, touchscreen, trackball, touchpad, keyboard, mouse, or other such device or module. In addition to providing graphic display and I/O capabilities above that of the simplified communication device 205, cooperating computing devices (e.g., 210) can also include more diversified and extensive software and data storage capabilities. For instance, cooperating computing devices (e.g., 210) can include an operating system 252 and one or more software applications 268, as well as data used by the software applications 268. In some examples, user profiles 270 can be maintained and stored (e.g., in data store 265) on a cooperating computing device 210 to include application data, and other files and data corresponding to a particular user. A user of a particular simplified communication device (e.g., 205) can authenticate to the cooperating computing device 210 and/or a particular user profile 270 so as to gain access to the data included in the user profile. In other instances, all or a portion of the user profile data can alternatively be stored on a simplified communication device 205. In still other instances, all or a portion of user profile data can be stored on devices remote from simplified communication device 205 and cooperating computing devices (e.g., 210), including cloud-based devices, the user profile data accessible to either or both of the simplified communication device 205 and cooperating computing devices (e.g., 210).

Cooperating computing devices 210 can include additional modules and functionality including a short range network adapter 255, I/O manager 260, and device manager 262. A short range network adapter 255 can be adapted to facilitate a cooperating computing device's 210 participation in a communication session over one or more short range networks 135, such as BLUETOOTH or WiFi networks. I/O manager 260 can be used to coordinate interaction with a cooperating simplified mobile communication device 205 over the short range network connection. For instance, user inputs received on the cooperating computing device's user interfaces 254 can be communicated to a simplified mobile communication device 205 connected to the cooperating computing device 210 over short range network 135. For example, a phone number can be selected or input by a user on a keypad of a cooperating computing device 210, prompting the phone number data to be forwarded to simplified mobile communication device 205 and used by the simplified mobile communication device 205 to initiate a telephone call to the phone number received over the short range network 135 from the cooperating computing device 210. Additionally, data, such as a website or GUI of an application can be received from the simplified mobile communication device 205, such as data from one or more data or web servers (e.g., 165) over a wireless broadband connection, and rendered and displayed (e.g., using graphical display 250) on the cooperating computing device.

As noted above, simplified mobile communication devices 205 can connect to and establish relationships with multiple different cooperating computing devices. Similarly, a single cooperating computing device 210, such as a single tablet computer or personal computer, etc. can provide I/O support for and/or be authenticated to using multiple different simplified mobile communication devices 205. For instance, a single computing device may maintain multiple different user profiles 270 and be shared among multiple users, each with their own associated simplified mobile communication device 205. Accordingly, device manager 262 can be used to manage relationships with pre-identified simplified mobile communication devices 205, for instance, to streamline connection to and provide enhanced support for particular simplified mobile communication devices 205 with which a particular cooperating computing device 210 has already communicated. In some instances, the establishing of a relationship between a simplified mobile communication device 205 and a cooperating computing device 210 can serve as a prerequisite to authentication of a user at the cooperating computing device through the sharing of a GUUID 238, authentication data 240, and other data from the simplified mobile communication device 205.

In one particular example, the GUUID 238 of the simplified mobile communication device can be private to the device 205 and not shared with or exposed to other devices. In some instances, a simplified mobile communication device 205 and a particular cooperating computing device can mutually authenticate, or pair, to the other. During such a pairing, certificates can be generated from the respective keys (e.g., the GUUID 238 of the simplified mobile communication device 205), and combined with the public key of the other device for use in pairing and establishing a trusted relationship between the two cooperating devices without requiring the GUUID (or other keys) to be explicitly shared between the devices.

Further, additional functionality can be provided through example cooperating computing devices (e.g., 210). For example, in some instances, cooperating computing devices 210, themselves, can include functionality for connecting to and communicating over various other communication networks, including the Internet 160 and even cellular networks 140. Further, certain cooperating computing device 210 implementations can include other functionality including a cloud data manager, for use in authenticating to and accessing data and services in cloud computing environments (e.g., on behalf of a user authenticated to the data using authentication data 240 provided through a cooperating simplified mobile communication device 205), contact lists and contact management (e.g., including telephone numbers for speed-dialing particular contacts), as well as voice recognition functionality and other functionality. While it is anticipated that in some implementations of simplified mobile communication device 205, voice and/or speech recognition capabilities will be resident on the simplified mobile communication device 205 itself, in other examples, voice and/or speech recognition functionality can instead or additionally be provided, at least in part, by a cooperating computing device 210. For example, a user can input voice data using the microphone of simplified mobile communication device 205 and the voice data can be communicated to a cooperating computing device (e.g., over short range network 135) for voice and/or speech recognition processing.

Figure 3A:
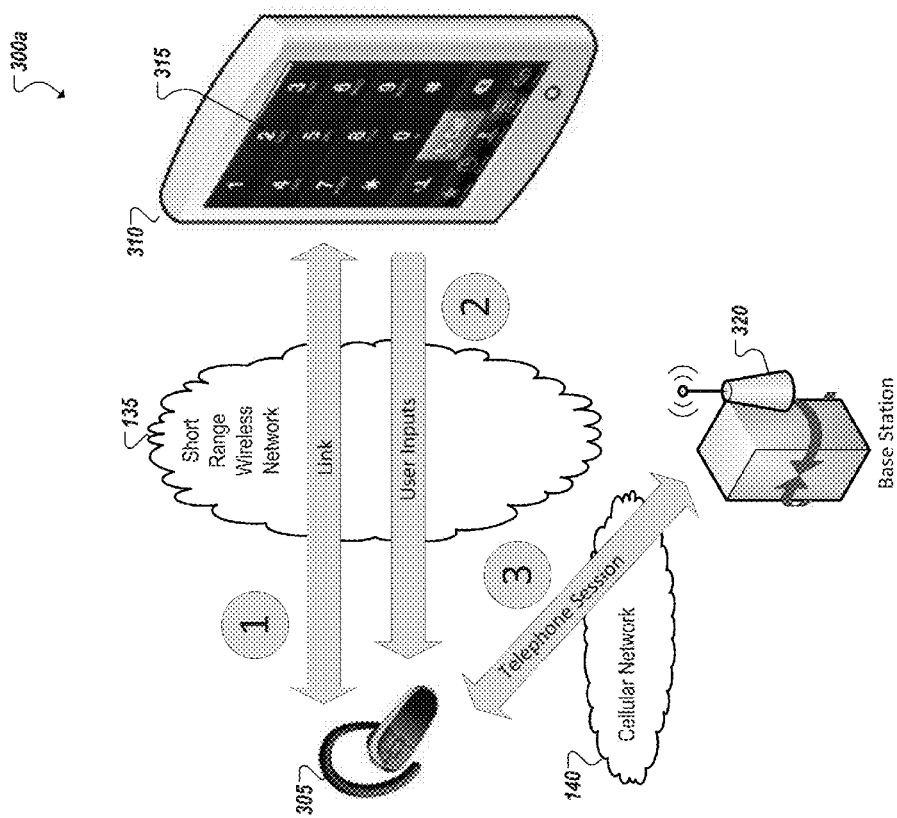
FIGS. 3A-3B are simplified block diagrams illustrating example operations including a simplified cellular telephone device in accordance with some embodiments.

Turning to FIG. 3A, example interactions and operations are represented in block diagram 300a involving a simplified mobile communication device, embodied in this particular example within an example hands-free headset telephone device 305, and cooperating computing device, such as an example touchscreen computer 310. Headset telephone 305 and touchscreen computing device 310 can discover that the other device is within range of a particular short range wireless network 135 and establish a connection, link, or pairing between the two devices 305, 310, for instance, using traditional BLUETOOTH connection protocols. With a pairing established between headset telephone 305 and touchscreen computing device 310, inputs can be received from a user interacting with and providing inputs using a touchscreen interface 315 of computing device 310. In this particular example, a numeric keypad GUI is presented on the touchscreen 315 and a user can input numbers corresponding to a particular telephone number. The telephone number can be communicated to the headset telephone 305 and then used by the headset telephone in the establishing of a telephone communication session over a cellular network 140. For instance, the headset telephone can communicate the telephone number to a cellular base station 145 in connection with the initiation of a telephone call with another device or network endpoint associated with the dialed telephone number entered using touchscreen 310.

Figure 3B:
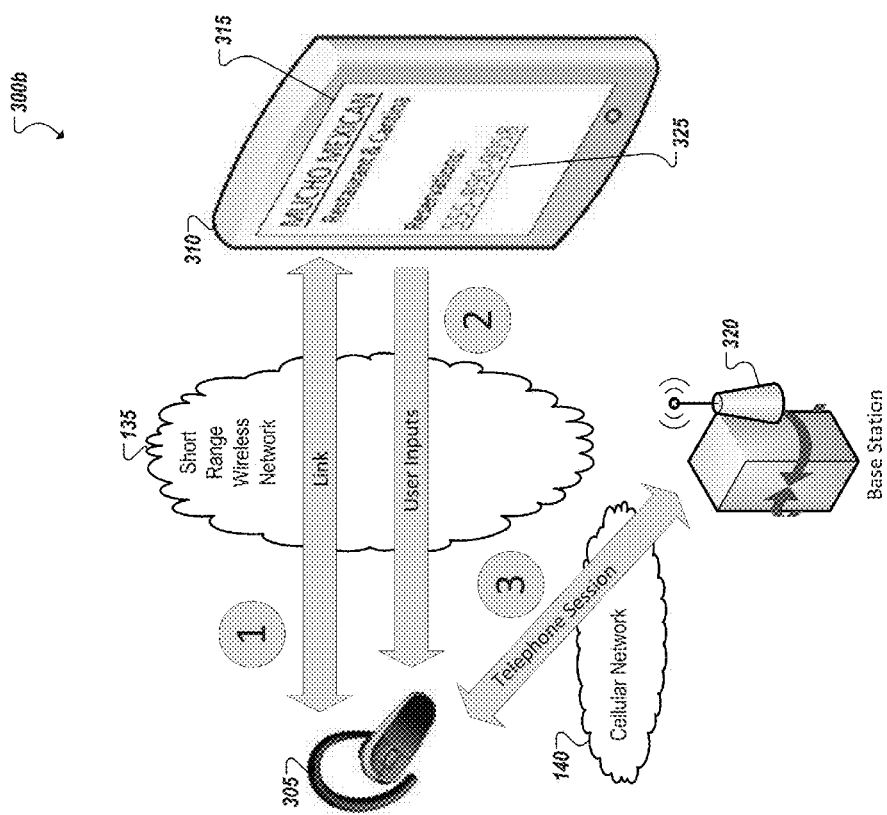

FIG. 3B illustrates another example of interaction and operations between devices 305, 310. In some instances, a telephone number can be selected by a user of touchscreen computing device 310 via an interface other than a numerical keypad interface, such as shown in FIG. 3A. For instance, some cooperating computing devices can include functionality for browsing and viewing web pages, and other files such as text, PDF, HTML, Adobe Flash, Java, and other files and scripts, including files accessed over a network (e.g., the Internet or private LAN) as well as files stored locally on the device 310. In some instances, an example cooperating computing device (e.g., 310) can view a file that includes an identified telephone number, name of a contact, or other identifier that can be used to identify a telephone number to be called using simplified mobile communication device (e.g., 305). As an example, in FIG. 3B, interactive content is displayed in graphical touchscreen interface 315, such as a webpage of a business that includes contact information for the business. In some instances, telephone numbers included in the displayed file can be automatically identified or otherwise designated as being telephone numbers and presented on the user interface as a selectable hyperlink (e.g., 325). In this particular example, touchscreen computer 310 pairs to headset telephone 305 and receives a user input, for instance, via the touchscreen interface 315 selecting the telephone number hyperlink 325. Data communicating the selected telephone number can then be communicated to the headset telephone 305 over a short range wireless network 135. As in the example of FIG. 3A, headset telephone 305 can receive the communicated telephone number and initiate and participate in a telephone call with devices associated with the communicated telephone number using cellular network 140 and cellular base station 320.

In some examples, the content displayed on cooperating computing device 310 can be received over a network, for instance, via a cellular broadband data network (e.g., 140) using headset telephone device 305. Indeed, in some instances, headset telephone 305 can transmit data collected from a remote web server or other source to the cooperating computing device 310 for display on the cooperating computing device 310. Other data and content can be accessed by the headset telephone 305 and forwarded to the cooperating computing device 310 for display on the interface 315 of the cooperating computing device, including global positioning system (GPS) data, SMS texts, audio, video, and other media including web pages, such as in the example of FIG. 3B. Further, in some instances, at least a portion of the processing of the data passed through the headset telephone 305 from cellular data network 140 to the cooperating computing device 310, can be processed and prepared for rendering using the headset telephone 305. Thus, cooperating computing devices (e.g., 310) can be developed that are substantially simpler in functionality than current, expensive smartphone and tablet computing devices, given that, in some implementations, much of the processing and network access functionality can be provided through headset telephone 305.

Modern conventional smart phones and personal computing devices, with their ever-expanding feature sets have also become expensive to manufacture and purchase. Further, with the increased mobility of computing devices, comes the enhanced risk of the devices being lost, stolen, forgotten, or damaged. Emerging security issues include the risk of unauthorized users accessing sensitive data, for instance, from emails, digital photos, documents, SMS messages, voicemails, and other files and data stored on portable computing devices. In some instances, simplified mobile communication devices (e.g., 305) can additionally include mechanisms for authenticating a user of the simplified mobile communication device (e.g., 305) to one or more cooperating computing devices (e.g., 310).

Given the simplified functionality of a simplified mobile communication device, some implementations of simplified mobile communication device can be embodied in devices that are also quite small relative to other cellular communication devices. By providing a device without a tactile interface or large display, a simplified mobile communication build can be slight enough to make the device easily wearable by a user. For instance, in the example of FIG. 4A, simplified mobile communication device 305 can be embodied as a headset telephone that can be worn around the ear of a user. Other implementations can also be wearable, such as simplified cellular telephone devices that can be worn as a necklace, as a lapel clip or brooch, a watch, or other implementations capable of being used as a telephone while being conveniently worn by a user. While conventional cellular phones are often carried in purses, pockets, and clipped to belts, conventional devices are often removed from their carriers, such as during dialing, viewing of graphical displays, and phone calls, providing opportunities for the cell phone to be separated from its user. In some instances, a wearable simplified cellular telephone device cannot only be worn, but can be continue to be worn while the user makes a phone call. Indeed, providing for a wearable simplified mobile communication device can create a more reliable and consistent link between a device and a user. Consequently, in some instances, simplified mobile communication device can function as a physical token to authenticate the user of the simplified mobile communication devices to cooperating computing devices used in cooperation with the simplified mobile communication device.

Figure 4A:
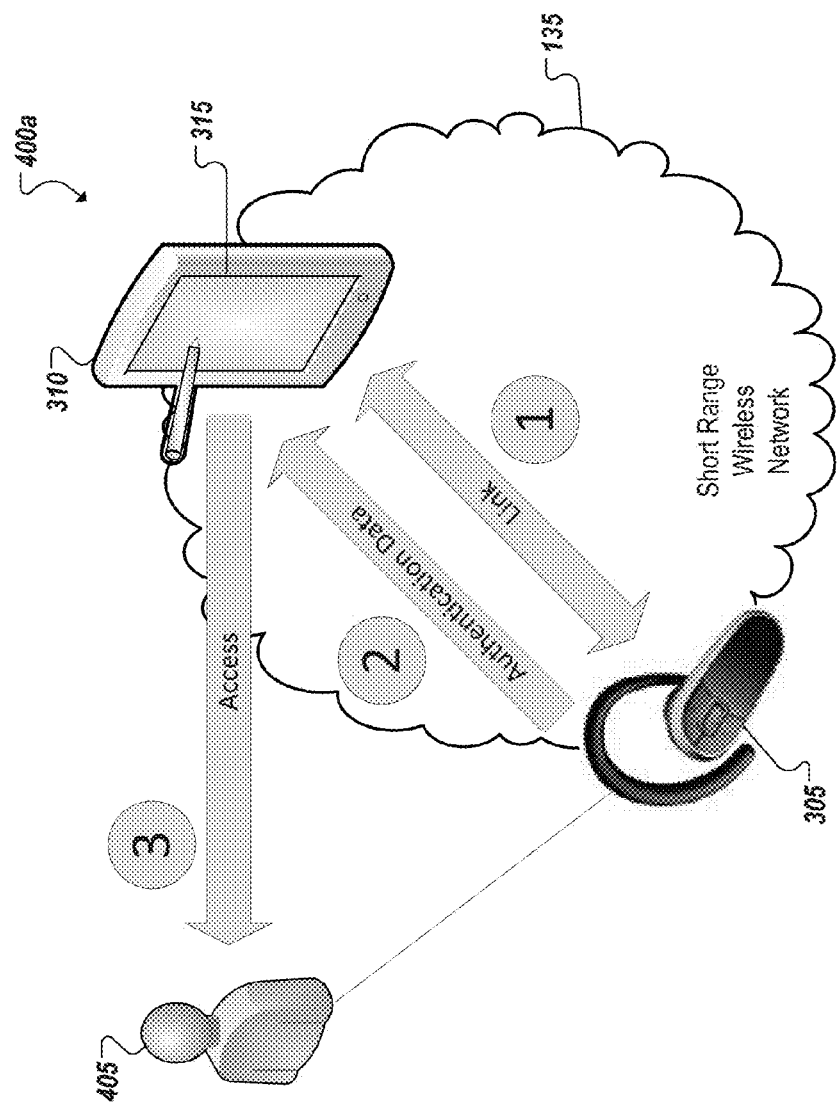

In the example of FIG. 4A, a user 405 carrying or wearing simplified headset telephone 305 carried or worn by a particular user 405 can connect to a cooperating computing device 310 capable, among other things, of providing I/O support to the simplified headset telephone 305 (e.g., via a touchpad interface 315). Prior to granting the user access to the cooperating touchpad device 310, authentication data, stored or sourced by the headset telephone device 305, can be sent and communicated to the cooperating computing device 310 and used by the cooperating computing device to authenticate a user associated with the authentication data sent by the headset telephone device 305 to the cooperating computing device 305.

In instances where a user trusts the security of a simplified mobile communication device, for instance, because the user wears or is otherwise in nearly constant possession of the simplified mobile communication device (e.g., given, it's size and ease of carrying), the user can elect to have the simplified mobile communication device serve as a wireless and convenient mechanism for authenticating the user to the user's devices, including devices the user is likely to use as a cooperating device in connection with the simplified mobile communication device 305. This can also simplify a user's use of multiple cooperating devices, allowing a user to, in some cases, to move from one device to another and automatically authenticate to the devices as the user 405 (i.e., the carried the simplified mobile communication device 305) comes within range of the device (e.g., defined by a range of a short range wireless network or other radio-frequency-based technique).

In some instances, one or more cooperating computing devices (e.g., 310) can be locked and rendered inoperable pending authentication by a particular simplified mobile communication device 305. While in some instances, authentication data exchanged with a cooperating computing device by mobile communication device 305 unlocks certain user profile data (i.e., data authorized for access by a particular user), in other instances, a particular cooperating computing device itself can be unlocked through a successful authentication of the mobile communication device 305 to the particular cooperating computing device 310. In such instances, a cooperating computing device's 310 operation can be dependent on a particular simplified mobile communication device 305 being collocated with the cooperating computing device 310, the particular simplified mobile communication device 305 serving as a wireless key to secure one or more of a user's computing devices (e.g., tablets, laptops, gaming systems, hard drives, etc.) from unauthorized access.

A variety of authentication types and authentication data can be used in connection with a simplified communication device authenticating its user to a cooperating computing device (e.g., 310), including examples discussed above. In one illustrative example, a simplified mobile communication device 305 can authenticate to a cooperating computing device 310 using a certificate exchange between the devices 305, 310. For instance, the simplified mobile communication device 305, upon identifying a potential cooperating computing device, can request access to the cooperating computing device 310. The simplified mobile communication device 305 can pass a certificate to the cooperating computing device 310. In some instances, the passing of the certificate can be in connection with an initial pairing of the devices 305, 310. The cooperating computing device 310 can verify the received certificate and generate a key, for instance, for use in subsequent communications with the devices 305, 310. The simplified mobile communication device 305 can similarly utilize a certificate received from the cooperating computing device 310 and generate its own key for use in communications with the cooperating computing device 310. Generation of such keys by either device can be based on and generated from both an internal key, device ID, GUUID, or other data internal to the device as well as data (e.g., a certificate) received from the other device in the pairing. Further, simplified mobile communication device 305 and cooperating computing device 310 can communicate securely, for instance, utilizing authenticated network access protocols such as EAP, EAP-TLS, EAP-MS-CHAP v2, and PEAP or other standard. Additionally, wireless protection protocols such as WEP, WPA, WPA2, etc. can also be used, among other techniques to secure communications between simplified mobile communication devices (e.g., 305) and cooperating computing devices (e.g., 310).

In some instances, two-factor security or authentication measures can be applied in connection with a simplified mobile communication device (e.g., 305) authenticating to a cooperating computing device (e.g., 310). In some instances, prior to using a particular simplified mobile communication device (e.g., 305) to authenticate a user to a cooperating computing device (e.g., 310), the particular simplified device and particular cooperating device can negotiate a relationship governing their cooperative functioning and communications. For instance, an encryption scheme can be pre-negotiated between a simplified device and cooperating device to ensure that data communicated between the devices over a short-range wireless network (e.g., 135) are secure. In such instances, the authentication data sent from the simplified device can itself be encrypted as it is communicated from the simplified device to the cooperating device. The cooperating device can utilize the authentication data to authenticate the user of the simplified device to the cooperating device.

Figure 4B:
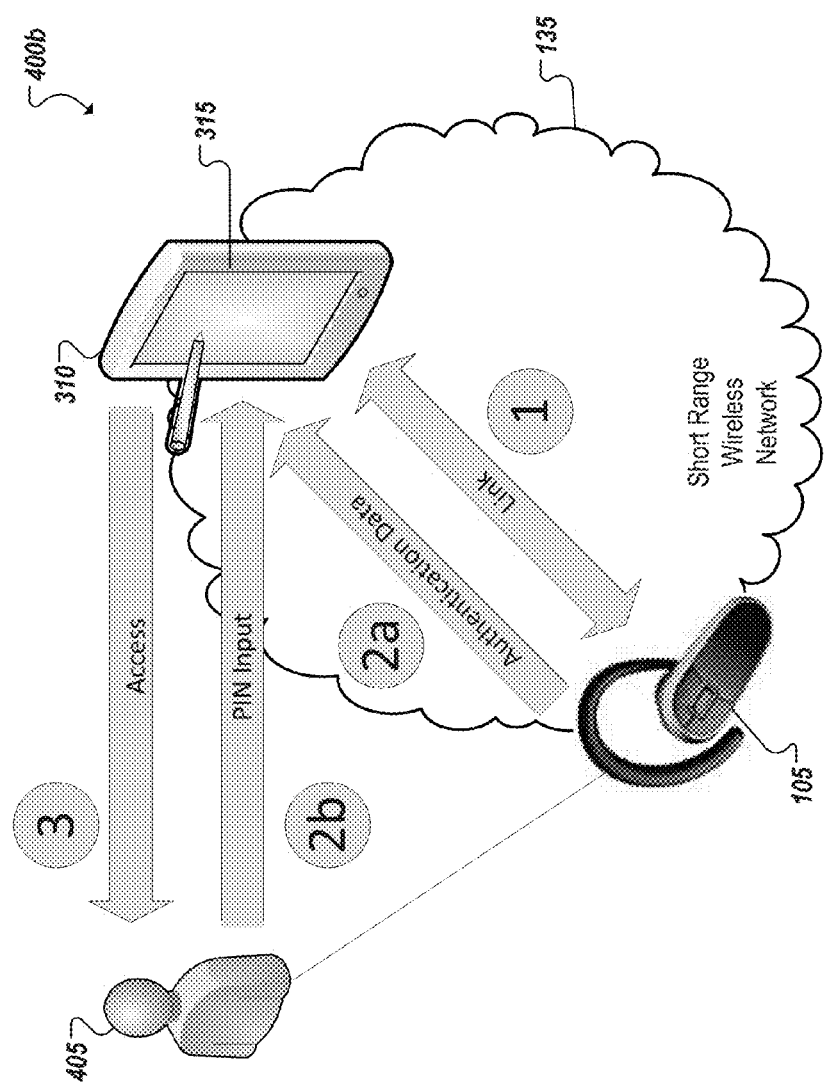

Two-factor (or, more generally, multi-factor) security or authentication schemes can be used to generally provide additional security against an unauthorized user gaining access to a simplified mobile communication device and thereby also associated cooperating computing devices. For instance, in the example of FIG. 4B, a two-factor authentication scheme is illustrated where a user provides a PIN number, password, or other user-entered passkey or data, supplementing the authentication data stored at and communicated from the simplified device 305 to the cooperating device 310. For example, a user 405 can interact with an interface (e.g., 315) of the cooperating touchscreen device 310 to supply a password, PIN, or other data indicating that the user 405 is authorized, not only to use the cooperating computing device 310, but also the simplified headset telephone 305. For example, were headset telephone 305 to fall into the hands of an unauthorized user, the unauthorized user could easily also gain access to cooperating computing devices recognizing and authenticating users by virtue of a connection with and receiving authentication data from the headset telephone 305.

Given the limited functionality of some implementations of simplified communication devices (e.g., 305), restricting a user's access to compatible or pre-identified and -configured cooperating devices (e.g., devices with which a corresponding simplified communication device has established a relationship) can effectively also protect against unauthorized use of the simplified communication device. In yet another example, illustrated in FIG. 4C, a two-factor authentication scheme can be implemented using authentication data communicated to a cooperating computing device (e.g., 310) by a simplified communication device (e.g., 305) using inputs received at the simplified communication device. In one example, a user 405 of the simplified communication device, a simplified headset telephone 305 in the example of FIG. 4C, can receive voice inputs from the user 405 in connection with an authentication of the user. For example, in some implementations, headset telephone 305 can include voice recognition functionality adapted to process voice data received through a microphone of the headset telephone 305 and determine whether the voice data substantially matches a voice sample of one or more authorized users of the headset telephone 305. In other implementations, it can be advantageous to provide the voice recognition functionality on the more functionally robust cooperating devices used in connection with the simplified mobile communication devices. For instance, in one example, a relationship can be established between a particular simplified communication device and one or more cooperating computing devices by pre-negotiating a voice-recognition step in the authentication of a user to the simplified communication device and/or cooperating computing device. Pre-negotiating a voice-recognition step can include the recording, sharing, and maintaining of voice sample data of authorized users of the cooperating computing devices. For example, voice sample data can be captured using the microphone of headset telephone 305 and communicated to a cooperating computing device (e.g., 310) in connection with setting-up a voice recognition check. Subsequent to the negotiation of a voice recognition check, a user can enter voice data using the microphone of the headset telephone 305 and the voice data can be sent to cooperating computing device for voice-recognition processing to check if the current user's voice matches a stored voice sample of an authorized user. Depending on the outcome of the voice analysis, a user (e.g., 405) can be granted or denied access to either or both of the cooperating computing device and simplified communication device. In other instances, voice recognition processing can be provided on the simplified headset telephone 305 and the outcome of the voice recognition can be the basis for determining whether to allow the headset telephone 305 to connect to other devices. Indeed, in some instances, if a voice recognition check fails, the simplified mobile communication device 305 can be disabled, temporarily or permanently.

Figure 5:
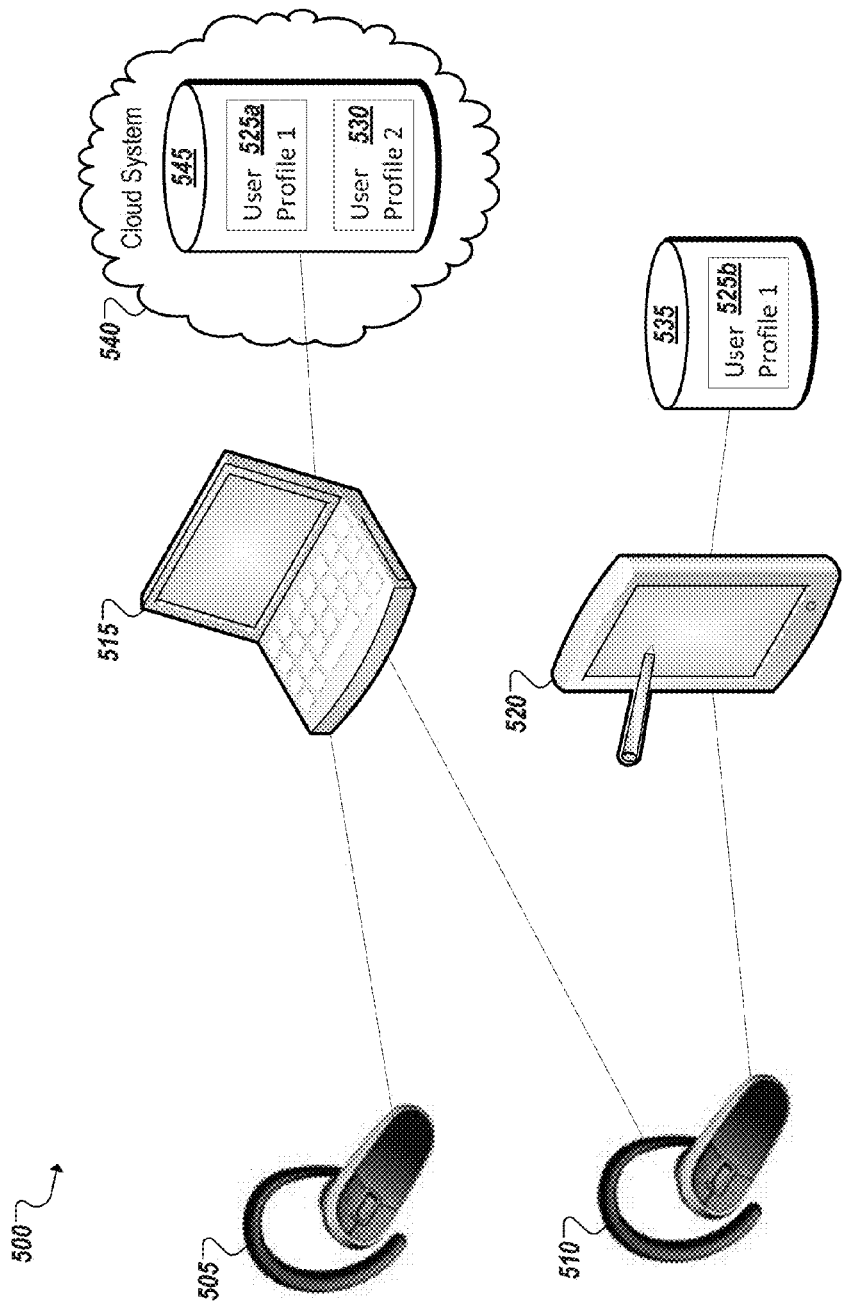
FIG. 5 is a simplified block diagram of example simplified cellular telephone devices and example cooperating computing devices in accordance with one embodiment.

As illustrated in FIG. 5, simplified mobile communication devices (e.g., 505) can operate cooperatively with multiple different cooperating devices (e.g., 515, 520). Similarly, a single cooperating device (e.g., 515) can operate cooperatively with multiple simplified mobile communication devices (e.g., 505, 510). For instance, a user of a single mobile communication device (e.g., 505) can utilize a plurality of different devices to accept inputs or display outputs on behalf of the simplified device 505. For example, a user can carry or wear a simplified mobile communication device 505, 510 throughout the day and may come in contact with or be in closest proximity to multiple different devices that can serve effectively as I/O peripherals of the simplified mobile communication device 505. For example, a user can desire to place a telephone call while seated in front of a personal computer (e.g., 515) in one instance, and use the personal computer to type or otherwise enter a telephone number that can be communicated to (e.g., over a short range wireless network connection or session) and used by the simplified mobile communication device 505 to place the phone call. In a subsequent instance, the user may wish to place a second telephone call while using or in proximity of another, different cooperating computing device. For example, the user can access a device such as a notepad computer, portable media player, in-car navigation or media controller device, video game console, computer kiosk or other public computer, or another computing device adapted to accept user inputs via a tactile user interface (such as a controller, keypad, mouse, touchpad, video game controller, or other tactile input mechanism) and input the telephone number of the second phone call using the second cooperating computing device. The entered telephone number can then be communicated to and used by the simplified mobile communication device over a short-range wireless communication session. Allowing a mobile communication device to accept inputs from, send data for graphical rendering to, or otherwise operate cooperatively with multiple different cooperating computing devices can permit a user to enjoy the benefits of, in some cases, a smaller, lighter, and more convenient simplified mobile communication device untethered to a single I/O device that can add girth and awkwardness to the design of a mobile communication device.

In some instances, a particular user can have access to multiple cellular network access accounts, such as one for their personal cellular voice communications, one for their business cellular voice communications, one for their personal mobile broadband data usage, one for their business broadband data usage, among many other examples. In traditional cases, users are forced to carry multiple cellphones, wireless broadband cards, mobile hotspot devices, etc. for each of their multiple accounts. In some implementations, a simplified mobile communication device can include or have access to SIM data for each of the plurality of accounts. In some instances, a user can designate which of the accounts the user wishes to use for a particular communication, such as a cellular phone call, using the simplified mobile communication device by using, authorizing to, or receiving input from a particular cooperating computing device. For example, a particular cooperating computing device can be configured to correspond to a particular account. Accordingly, by using or authenticating to a particular cooperating computing device, a particular account can also be identified, and in some cases, SIM or other data transmitted between the cooperating computing device and the simplified mobile communication device allowing the simplified mobile communication device to establish cellular communication sessions under the identified account. In other examples, a user can use an interface of a cooperating computing device to select one of a plurality of accounts for use in a particular cellular communication using the simplified mobile communication device, among other examples.

As noted above, an example cooperating computing device (e.g., 515) can also serve as an I/O device and maintain relationships with multiple different simplified mobile communication devices (e.g., 505, 510). For example, in a household where multiple simplified communication devices are owned and utilized (and associated with particular users), one or more computing devices can be used as cooperating computing devices shared between the multiple simplified communication devices. Public, semi-public, or other shared computing devices can also be configured to connect to and provide I/O support to multiple simplified mobile communication devices associated with a plurality of different users, such as in an internet cafe, university computer lab, office environment, or other environment. In still other examples, kiosk computing devices can be provided that are configured with touchpads, or other user interface devices, together with short range networking capabilities (e.g., using BLUETOOTH, WiFi, or another protocol), allowing the kiosk devices to connect to and serve as a public cooperating computing device for use by numerous simplified mobile communication devices and their users. In some implementations, a simplified mobile communication device can pair to the kiosk, for instance using a once-only pairing (e.g., that does not result in credentials of the simplified mobile communication device being stored by the kiosk). In some respects, such public or semi-public kiosks could serve as a substitute for (or be provided in connection with) public telephone booths or other public communications or computing services or outposts. Such a kiosk can establish communication sessions with a particular one of a plurality of detected simplified mobile communication devices and allow a corresponding user to access the device to place a telephone call or access data (e.g., over a cellular broadband data network) for presentation on the kiosk using the simplified mobile communication device. In other instances, use of a kiosk can be tracked and monetized, so that users of the kiosk are billed according to their use of the kiosk.

In some implementations, a simplified mobile communication device can serve as an authentication token, providing authentication data corresponding to the user of the simplified mobile communication. In some instances, by connecting to a simplified mobile communication device and receiving authentication data from the simplified mobile communication device (and, in some cases, receiving additional corroborating authentication data, such as a PIN, password, or voice signature) a particular cooperating computing device can identify a particular user (i.e., of the simplified mobile communication device) and access profiles and other data (including files, application data, contact lists, email, histories, and other data associated with or authorized for access by the particular user) (collectively "user profile data" (e.g., 525a, 525b, 530)) corresponding to the authenticated user. For example, particular user profile data (e.g., 525a, 525b, 530) can be accessed using particular cooperating computing devices (e.g., 515, 520). In some instances, particular user data (e.g., 325b) corresponding to one or more users can be stored locally in memory (e.g., 535) of a cooperating computing device and made available upon authentication of the corresponding user. For example, a first user of a simplified mobile communication device (e.g., a headset cellular telephone 505) can utilize the simplified mobile communication device 505 to authenticate the first user on a cooperating computing device 520 to access particular user profile data 525b stored on the device 520. In some instances, user profile data 525b stored on the cooperating device 520 can be used in connection with the functionality of the simplified mobile communication device. For instance, user profile data 525b can include a user's contacts including telephone numbers associated with the contacts. In some instances, user profile data 525b can include data tied to a particular network service provider (e.g., to identify that calls placed while using the cooperating computing device are to be attributed to a particular network service contract associated with the particular cooperating computing device 510, such as SIM data, among other examples).

In some instances, authentication of a user to a particular cooperating computing device can serve to allow access to user profile data (e.g., 525*a*, 530) stored remotely from the cooperating computing device and mobile communication device (e.g., 505, 510). For instance, user profile data 525*a*, 530 for a plurality of users can be maintained in a distributed computing environment, such as server pools or cloud-based data storage environments (e.g., 540). In some examples, a cloud session can be established through and linked to a simplified mobile communication device. The cloud session can allow data to persist between various cooperating devices authenticated to using the simplified mobile communication device. For instance, a user can begin typing an email or other document on a first cooperating computing device and move to a second cooperating computing device, maintaining the cloud session and allowing the user to access and continue drafting the incomplete email from the first cooperating computing device. A cooperating computing device (e.g., 515) can serve as a client to the data servers (e.g., 545) and utilize authentication data provided by a simplified mobile communication device (e.g., 505, 510) to gain authorization to access and/or be provisioned with data maintained by the cloud-based data store 545 for a user associated with the simplified mobile communication device. Alternatively, authentication data to cloud-based data store 545 can be maintained at the cooperating computing device 515, with the authentication data of the simplified communication device 505 serving to unlock use of the cooperating computing device 515 and thereby also the data in data store 540 or the cooperating computing device's access to remote data stores (e.g., 545).

In some examples, multiple, different user profiles 525*a*, 530, each associated with a different user (via an associated simplified mobile communication device (e.g., 505, 510)) can be accessed using a single cooperating computing device (e.g., 515). For example, cooperating computing device 515 can establish a connection with one of a plurality of simplified mobile communication devices 505, 510 and authenticate a user to the cooperating computing device 515 based on authentication data received from the respective simplified mobile communication device. Through the authentication data (and/or user identification data) received from the respective simplified mobile communication device, the cooperating computing device 515 can identify user profile data for the corresponding user, including files and data with access restricted to the corresponding user. Such profile data can be included among a plurality of profiles, and stored locally on the cooperating computing device. In other instances, the user profile data can be accessible from a remote storage system (e.g., 540) and the authentication data received from the simplified mobile communication device can be used to authenticate the cooperating computing device' access to the remote data store.

In still further examples, the use of remote or cloud-based user profile data stores can allow a user to provision one of a plurality of different devices with user profile data. In one implementation, simplified mobile communication devices (e.g., 505, 510) can provide authentication data to one of a plurality of cooperating computing devices allowing the cooperating computing device to retrieve user profile data from a remote data store (e.g., 545) and provision the cooperating computing device with the user profile data. In some instances, provisioning the cooperating computing device can serve to at least temporarily cause the cooperating computing device to mirror the personal setting and data present on the user's personal computer(s). Accordingly, through the use of simplified mobile communication device, a user can move from one computing device to the next and allow their personal data to be provided (at least temporarily) on each of the devices. In some instances, the cooperating computing devices merely serve as a client for accessing and changing data that is stored and maintained at the remote data store 545. In either event, a user can easily make use of multiple computing devices while enjoying access to their personal data and files, all while enjoying the security provided by linking access to the personal user profiles to the user's possession of (and in some cases authorization to) a simplified mobile communication device associated with the user.

Further, in addition to at least partially unlocking data, applications, and functionality of a cooperating computing device through the sharing of authentication data by virtue of collocation of a particular simplified mobile communication device with the cooperating computing device, a particular simplified mobile communication device can also be used to authenticate a user to the peripherals of a cooperating computing device. For instance, a particular cooperating computing device, such as a laptop, may be connected, wirelessly or by wireline, to detachable hard drive devices, printers, disk readers, credit card readers, web cameras, monitors, and other peripheral hardware. In some instances, use of particular peripherals (such as a particular detachable hard drive, or space within that hard drive) can be disabled pending authentication of a user to the cooperating computing device using the particular simplified mobile communication device. In such instances, a simplified mobile communication device can serve as a key for unlocking multiple cooperating computing devices through a single authentication.

Figures 6A, 6B:
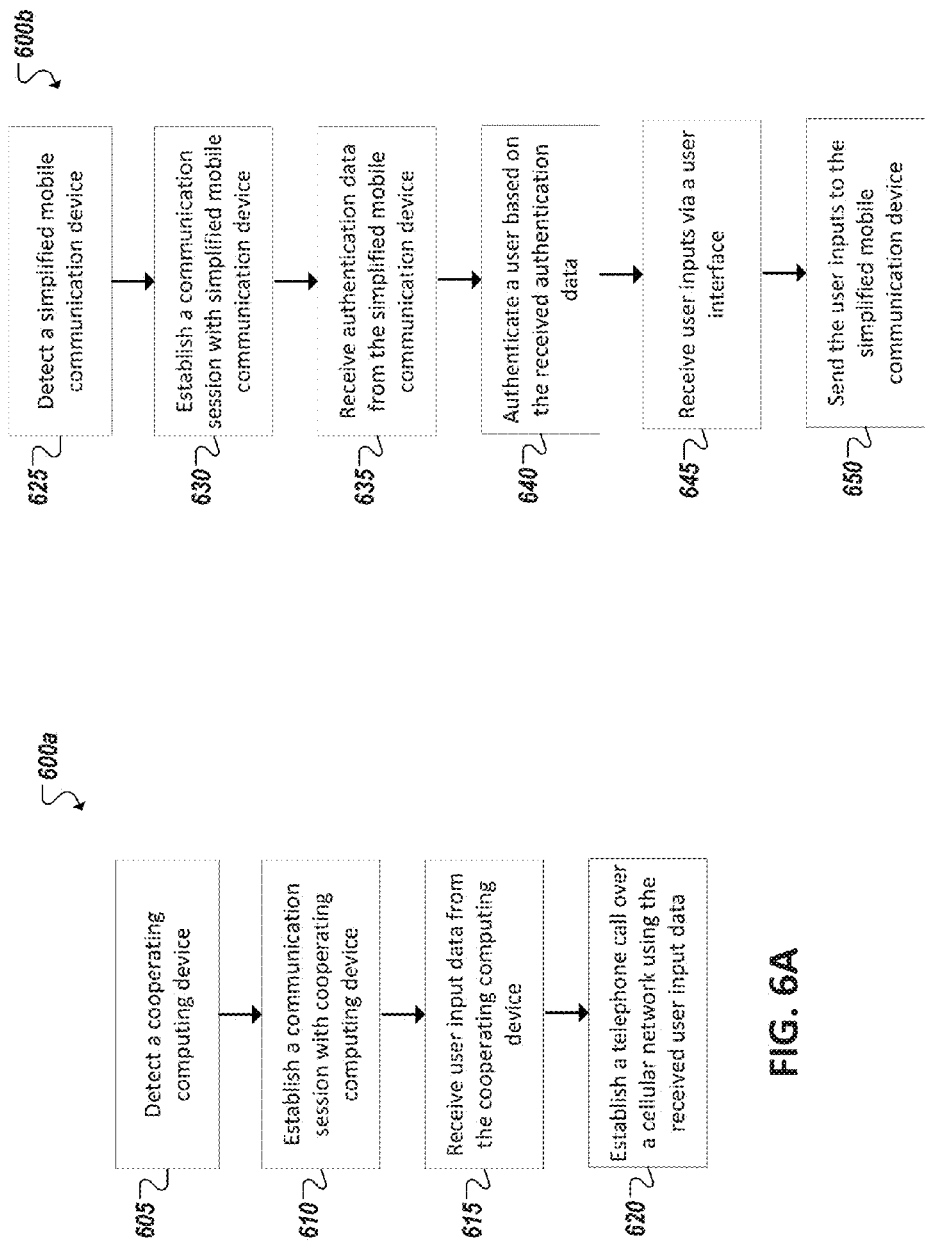
FIGS. 6A-6B are simplified flowcharts illustrating example techniques for cooperative interactions between an example simplified cellular telephone device and another computing device.

FIGS. 6A-6B are simplified flowcharts 600*a-b* illustrating example techniques for cooperatively using a simplified communication device with a cooperating computing device. In a first example, illustrated in flowchart 600*a*, a cooperating computing device can be detected 605 by a simplified communication device, such as a headset telephone lacking a user interface capable of receiving telephone numbers via tactile inputs or other similar space-intensive user interfaces. The cooperating computing device can be detected 605 as being substantially collocated with the simplified communication device, such as residing within range of a common short range wireless network, such as a BLUETOOTH piconet. A communication session can be established 610 between the simplified communication device and the cooperating computing device, for instance, over the short-range wireless network. Establishing 610 the communication session can include handshaking and the exchange of other data used to coordinate communication between the devices throughout the session, such as according to traditional BLUETOOTH communication protocols. In some instances, establishing 610 the communication session can include establishing a relationship between the devices or recognizing a pre-existing relationship between the devices. Such relationships can be associated with particular users or user accounts. Within the established communication session, user inputs can be received through one or more user interfaces of the cooperating computing device and passed to the simplified mobile communication device for use by the simplified communication device in connection with communications over a cellular network. For instance, the input data can include a telephone number. The simplified communication device can establish 620 a telephone call over the cellular network using the telephone number entered at the cooperating computing device. Other information can be communicated by the simplified mobile communication device over a cellular network using or based on data received from a cooperating computing device, including requests for data, such as web pages and other electronic media served by host devices on the Internet.

In the flowchart 600b of FIG. 6B, example operations of a cooperating computing device are illustrated, including the detection 625 of a simplified mobile communication device substantially collocated with the computing device and seeking to use I/O functions of the computing device. For example, a simplified mobile communication device can be identified as present in or within range of a short-range wireless network. A communication session can be established 630 with the simplified mobile communication device and authentication data can be received 635 from the simplified mobile communication device. A particular user (e.g., the user of the simplified mobile communication device) can be authenticated 640 based on the received authentication data. Authentication data can include a digital certificate or signature, encryption key, token, voice sample, or other authentication data. Supplemental authentication data can also be received from a user, such as a PIN, password, voice sample, etc. to verify that the user is rightfully in possession of the simplified mobile communication device being used as a physical token to authenticate a user to the cooperating computing device. Upon authentication, user inputs can be received 645 through one or more user interfaces of the cooperating computing device, such as a keyboard, touchscreen, mouse, trackball, joystick, video game controller, keypad, or other user interface capable of receiving tactile inputs from a user. The received inputs can then be sent 650 to the simplified mobile communication device, for instance, over the short range wireless network. The simplified mobile communication device can then use the inputs from the cooperating computing device to establish connections and exchange data over one or more cellular networks.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. In one alternative system or tool, the wireless authentication functionality of a simplified mobile communication device can be employed on a removable storage device, such as a portable hard drive, thumb drive, or the like. In such instances, the removable storage device can lack a user interface but possess wireless access functionality for connecting to cooperating computing devices over a short-range network, such as BLUETOOTH, and sharing authentication data with the cooperating computing devices over the short-range network to authenticate the holder of the wireless, portable storage device to one or more cooperating computing devices, allowing the user to both gain access to (and secure) the cooperating computing device through the wireless storage device as well as access, consume, and modify data stored on the hard drive using the authenticated-to cooperating computing device. Other systems and tools can also make use of principles of this disclosure. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure.

Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory, machine-accessible storage medium having instructions stored thereon, the instructions when executed on a machine, to cause the machine to:
   send authentication data from a wireless headset device to a first communication device over a short-range wireless network, wherein the authentication data is bound to a particular user, and the authentication data is to authenticate the particular user to the first communication device and authorize access by the wireless headset device to the first communication device;
   receive input data at the wireless headset device from the first communication device over the short-range wireless network;
   initiate a communication session between the wireless headset device and a cellular base station in response to receiving the input data from the first communication device at the wireless headset device; and
   send data received during the communication session from the cellular base station at the wireless headset device to the first communication device for display by the first communication device.

2. The storage medium of claim 1, wherein the input data comprises a telephone number.

3. The storage medium of claim 1, wherein the input data comprises a uniform resource locator (URL).

4. The storage medium of claim 1, wherein the input data is entered by the particular user on a touch-sensitive display of the first communication device.

5. The storage medium of claim 1, wherein the input data is selected from a webpage displayed by the first communication device.

6. The storage medium of claim 1, wherein the input data comprises a name of a contact from a list of contacts of the particular user.

7. The storage medium of claim 1, wherein the instructions, when executed, further cause the machine to send data received from the cellular base station at the wireless headset device to the first communication device for display by the first communication device.

8. The storage medium of claim 7, wherein the data sent to the first communication device for display by the first communication device is rendered by the first communication device.

9. The storage medium of claim 1, wherein the instructions, when executed, further cause the machine to capture voice inputs and output audio.

10. The storage medium of claim 1, wherein the instructions, when executed, further cause the machine to:
    receive voice inputs at the wireless headset device; and
    send voice data corresponding to the received voice inputs to the cellular base station in connection with the communication session.

11. The storage medium of claim 1, wherein the authentication data comprises an encryption key and wherein content accessible through the first communication device is decrypted based at least in part on the received encryption key.

12. The storage medium of claim 1, wherein the authentication data comprises at least one of a digital certificate, a digital signature, and an encryption key.

13. The storage medium of claim 1, wherein authentication of the user to the first communication device includes receiving second authentication data from the user at the first communication device.

14. The storage medium of claim 1, wherein the instructions, when executed, further cause the machine to:

send the authentication data from the wireless headset device to a second communication device over a second short-range wireless network, wherein the authentication data is to authenticate the particular user to the second communication device and authorize access by the wireless headset device to the second communication device;

receive input data at the wireless headset device from the second communication device over the short-range wireless network; and initiate a communication session between the wireless headset device and the cellular base station in response to receiving the input data from the second communication device.

15. The storage medium of claim 1, wherein the instructions, when executed further cause the machine to:
receive voice input from the particular user;
compare the voice input to a voice profile for the particular user; and
authenticate the user on the wireless headset device based on the comparison.

16. An apparatus comprising:
a memory element to store user authentication data;
a short-range wireless network adapter;
a cellular adapter to communicate with a cellular base station; and
a processor to:
send authentication data to a first communication device over a short-range wireless network, wherein the authentication data is bound to a particular user, and the authentication data is to authenticate the particular user to the first communication device and authorize access by the apparatus to the first communication device;
receive input data from the first communication device over the short-range wireless network;
initiate a communication session with the cellular base station in response to receiving the input data from the first communication device; and
send data received during the communication session from the cellular base station at the apparatus to the first communication device for display by the first communication device.

17. The apparatus of claim 16, wherein the apparatus further comprises:
a microphone; and
a speaker;
and wherein the cellular adapter includes an antenna to communicate with cellular base stations.

18. The apparatus of claim 17, wherein the apparatus lacks a graphical user display.

19. A method comprising:
sending authentication data from a wireless headset device to a first communication device over a short-range wireless network, wherein the authentication data is bound to a particular user, and the authentication data is to authenticate the particular user to the first communication device and authorize access by the wireless headset device to the first communication device;
receiving input data at the wireless headset device from the first communication device over the short-range wireless network;
initiating a communication session between the wireless headset device and a cellular base station in response to receiving the input data from the first communication device; and
sending, by the wireless headset device, data received during the communication session from the cellular base station to the first communication device for display by the first communication device.

20. The method of claim 19, wherein the input data is selected from a webpage displayed by the first communication device.

* * * * *